United States Patent [19]

Pham

[11] 4,386,299
[45] May 31, 1983

[54] ELECTRONIC CONTROL CIRCUIT FOR A SEPARATELY EXCITED DC MACHINE

[75] Inventor: Quang M. Pham, Elancourt, France

[73] Assignee: Societe Anonyme dite: Alsthom-Atlantique, Paris, France

[21] Appl. No.: 218,986

[22] Filed: Dec. 22, 1980

[30] Foreign Application Priority Data

Dec. 20, 1979 [FR] France .................................. 79 31244

[51] Int. Cl.³ .............................................. H02D 3/14
[52] U.S. Cl. ..................................... 318/261; 318/375
[58] Field of Search ............... 200/144 R; 307/252 M; 318/249, 345 G, 261, 294, 375–381, 258

[56] References Cited

U.S. PATENT DOCUMENTS 3,501,684 3/1970 Webb .................................. 318/258
4,054,821 10/1977 Williamson ........................ 318/375

*Primary Examiner*—J. V. Truhe
*Assistant Examiner*—Saul M. Bergmann
*Attorney, Agent, or Firm*—Sughrue, Mion, Zinn, Macpeak and Seas

[57] ABSTRACT

An electronic circuit designed to control entirely by electronic means the change from traction mode to braking mode and vice-versa of a separately excited DC machine and the forward and reverse operation of the motor as well as rheostatic braking. The chopper includes two main thyristors (T1) and (T2) and a single switch-off thyristor (T3) for the two main thyristors. The direction of current flow through the separate excitation winding (J) is determined by four thyristors (T5) to (T8).

Application to railway traction.

5 Claims, 1 Drawing Figure

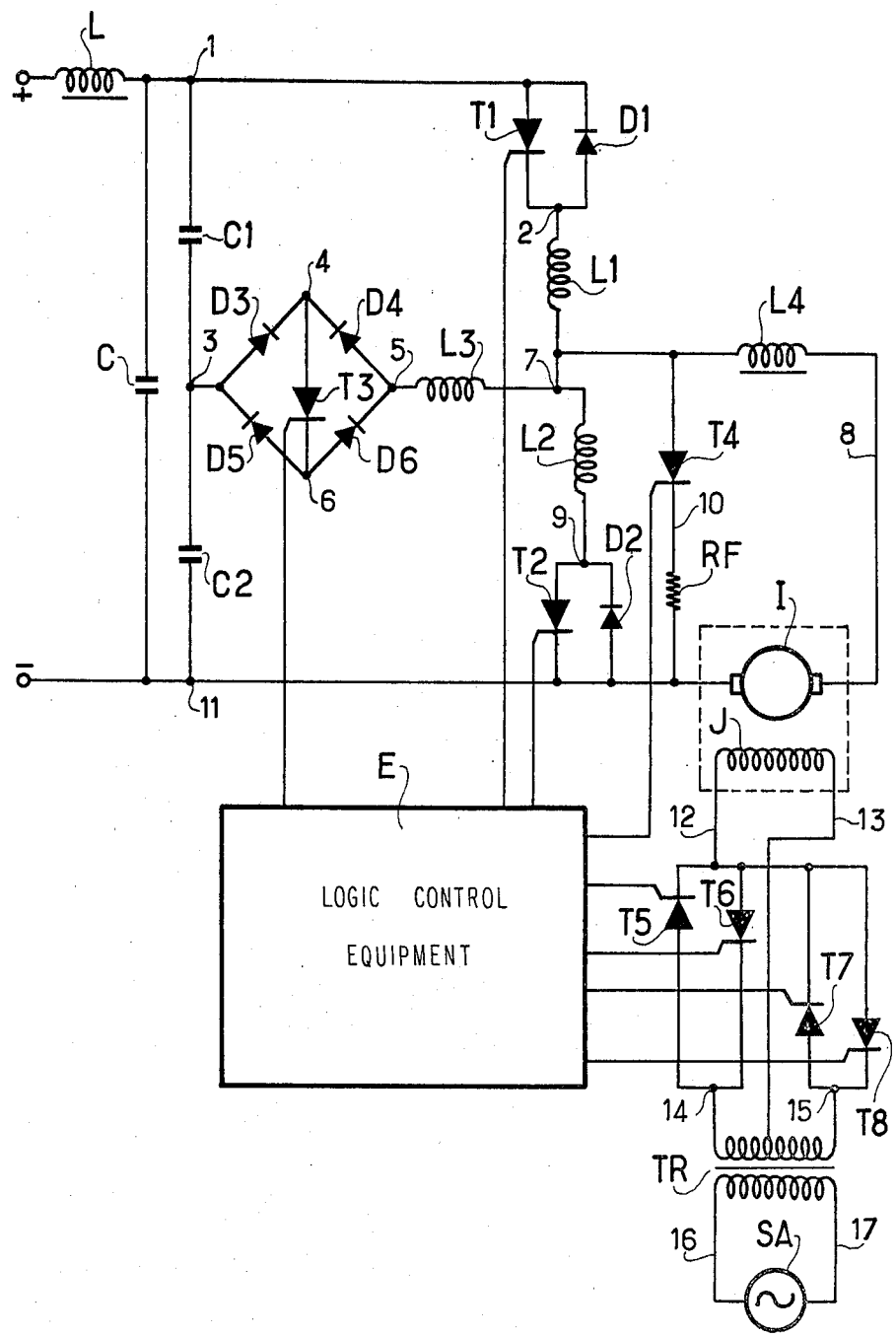

ELECTRONIC CONTROL CIRCUIT FOR A SEPARATELY EXCITED DC MACHINE

The invention relates to an electronic control circuit for a separately excited DC machine used for the electric propulsion of vehicles e.g. railway vehicles. The electric machine can operate either in traction mode or in regenerative or rheostatic braking modes; further the operating direction of the machine may be reversed.

BACKGROUND OF THE INVENTION

Electronics chopper circuits and switching between traction mode and braking mode by electronic components are known. Known circuits use choppers capable of operating both in step-up (booster) and in step-down modes, and therefore require complicated electronic or electromechanical circuits to switch from step-down to booster mode and vice-versa. In the prior art, heavy and bulky electromechanical circuits are used to switch from the traction mode to the braking mode and vice versa. Likewise, the operating direction of the machine is reversed in the prior art by electromechanical apparatus.

In the present invention which remedies these drawbacks, the electronic chopper operates as both a step-down chopper and a booster chopper and feeds a separately excited DC machine. It uses entirely electronic means to enable the DC machine to operate either in drive mode or in regenerator mode. Preferred embodiments of the invention also provide static switching for reversing the operating direction (forward or reverse) of the DC machine, and for varying the effective rheostatic braking resistance.

The present invention provides an electronic circuit for a separately excited DC machine that includes an armature and a field winding arranged for separate excitation, the electronic control circuit comprising:

positive and negative input terminals for connection to a source of smoothed DC;

first and second armature output terminals for connection to the armature of the DC machine;

a step-up/step-down chopper circuit connected to said input terminals and to said armature output terminals;

a logic control circuit connected to the chopper circuit;

a rheostatic braking circuit connected between the armature output terminals; and a reverser circuit having first and second field winding output terminals for connection to the field winding of the DC machine, input terminals for connection to a source of electrical power and switching means for connecting DC of a selectable polarity to the field winding output terminals;

the improvement wherein the chopper circuit comprises:

a capacitor bridge connected across the positive and negative input terminals, the capacitor bridge comprising a first capacitor and a second capacitor connected in series to provide a capacitor bridge mid-point terminal;

a traction/braking bridge connected across the positive and negative input terminals, the traction/braking bridge comprising a traction arm and a braking arm connected in series to provide a traction/braking bridge mid-point terminal;

each arm of the traction/braking bridge comprising a respective thyristor connected in series with a respective protective inductor and in parallel with a respective diode, the traction and braking thyrsistors both being connected to conduct electricity selectively in the direction from the positive input terminal towards the negative input terminal, and the traction and braking diodes being connected with the opposite direction of conductivity; and a turn-off circuit connected in series between the mid-point terminals of said bridges, the turn-off circuit comprising a turn-off inductor connected in series with a bi-directional, static, turn-off switch; one of the armature output terminals being connected to same one of the positive and negative input terminals as is connected to the braking arm of the traction/braking bridge, and the other armature output terminal being connected to the mid-point of the traction/braking bridge, with an armature current smoothing inductor being connected in series in the armature circuit; and the logic control circuit being operatively arranged within the circuit so as to cyclically switch on the thyristor in a selected one of the arms of the traction/braking bridge, and then to switch on the turn-off switch in order to cause said selected thyristor to be turned-off, the on-duty ratio of the traction thyristor determining the tractive effect and the off-duty ratio of the braking thyristor determining the regenerative braking effect.

Preferably said reverser circuit comprises an AC electric source which feeds a primary winding of a transformmer having a centre-tapped secondary winding with its ends connected to respective pairs of thyristors connected head-to-tail, each thyristor pair being connected to one of said field winding output terminals with the other field winding output terminal being connected to the mid point of said secondary winding, said logic control circuit being connected to select one thyristor from each pair to determine whether the DC machine is to operate in the forward or reverse direction.

Preferably said rheostatic braking circuit comprises a braking thyristor connected in series with a braking resistance, said logic circuit causing the braking thyristor to conduct with a variable duty ratio during rheostatic braking.

Naturally the combination of both the static switched reverser circuit and the static, switched rheostatic braking circuit is advantageous in practice.

In any of the above arrangements the bi-directional, static, turn-off switch may advantageously comprise a full-wave rectifier bridge with its AC terminals connected in series in the turn-off circuit and its DC terminals connected to be selectively shorted together by a turn-off thyristor.

BRIEF DESCRIPTION OF THE DRAWING

One embodiment of the present invention is described hereinafter by way of a purely illustrative and non-limiting example and with reference to the single accompanying FIGURE which is a circuit diagram showing the operating principle of an electrical control circuit in accordance with the invention for controlling a separately excited DC machine.

DESCRIPTION OF PREFERRED EMBODIMENT

In the FIGURE, T1 and T2 are two main thyristors provided with two return diodes D1 and D2 and a single extinguishing thyristor T3. Diodes D3, D4, D5 and D6 constitute a fullwave rectifier used for switching off thyristors T1 and T2.

A low-pass input filter formed by a series inductor L with parallel capacitor C, receives power from a DC source (+−) and supplies smoothed DC to terminals 1 and 11. L1 and L2 are inductors which protect thyristors T1 and T2. L3 is an extinguishing inductor. L4 is an inductor for smoothing the current induced by the motor; C1 and C2 are extinguishing capacitors. Components C1,C2,L1,L2,L3,L4,D1,D2,D3,D4,D5,D6,T1, T2 and T3 constitute an electrode voltage regulator. I is the armature of the DC machine with a seaprate excitation winding J. T4 and RF are respectively a thyristor and a braking resistance. In combination they constitute a rheostatic braking circuit. An AC source SA is connected to a transformer TR and a centre tapped secondary winding connected to thyristor pairs T5 and T7, and T6 and T8 to supply power to the separate excitation winding J.

For operation in the forward direction the excitation current is controlled by thyristors T5 and T7; when operating in the reverse direction, winding J is excited by thyristors T6 and T8. In each case the centre tapped winding and the operative thyristor pair acts as a full-wave rectifier bridge, with the direction of current flow being selected by selecting one or other of the thyristor pairs. The operating direction of the DC machine is thus selected statically. By way of example, the trigger of T5 is fired during the positive halfcycle of the source SA, while the trigger of T7 is fired during the negative alternation of the source SA.

The logic control equipment of the power circuits is shown in the FIGURE as a rectangle E.

The drive circuit includes C1, C2, L1, L2, L3, L4, D1, D2, D3, D4, D5, D6, T1, T3, and I. The drive circuit operates as a step-down chopper so that the machine operates as a motor since the voltage of the DC source (+−) is transformed to a lower voltage at the terminals of the armature I. Operation is as follows: the thyristor T1 is switched on by a control pulse periodically supplied by E at a period of T and remains on for a time x.T, where the proportion of time x for which the thyristor remains conductive is electronically adjustable between zero and one. T is the operating period of the chopper and x is the duty ratio. The circuit (L4, I) is thus subjected to a voltage equal to the DC supply voltage during a period x.T and to zero voltage during a period equal to (1−x)T; adjusting the ratio x makes it possible to obtain any voltage across the armature terminals lying between a very low value and a value close to that of the smoothed DC supply voltage V applied across terminals 1 and 11. When T1 is on, the current flowing through the armature increases; when T1 is off, the armature current decreases. The armature current cannot be switched off during the period t=(1−x).T, so the diode D2 allows the current to continue flowing through the armature I when T1 is off. The process of turning off the current in T1 makes use of capcitors C1 and C2 which are both of same capacity. They form a capacitor bridge between the DC terminals 1 and 11 such that initially each of the capacitors is charged to a voltage +V/2, with a mid-point terminal 3 being at +V/2 with respect to terminal 11. To turn off T1, thyristor T3 is turned on and two sinusoidal inversion currents are set up: the first inversion current flows round the loop (1, T1, 2, L1, 7, L3, 5, D4, 4, T3, 6, D5, 3, C1, 1) and the second inversion current flows from terminal 1 to terminal 11 via 1, T1, 2, L1, 7, L3, 5, D4, 4, T3, 6, D5, 3, C2 and 11 (the underlined references constitute the difference between the two lists). At the end of inversion, these two currents cancel each other, and capacitor C1 is charged to −V/2 with its positive polarity at 3, while capacitor C2 is charged to +3 V/2 with the positive polarity at 3 (in other words the mid-point terminal 3 becomes positive with respect to the positive terminal 1). The process of switching off T1 then begins also by setting up two sinusoidal currents: the first current flows round the loop (3, D3, 4, T3, 6, D6, 5, L3, 7, L1, 2, D1, 1, C1, 3) and the second current flows from 11 to 1 via 11, C2, 3, D3, 4, T3, 6, D6, 5, L3, 7, L1, 2, D1, 1 (differences marked by underlining). Diode D1 starts conducting as soon as the current is cancelled in T1 which is then switched off by a reverse voltage appearing across its terminals for a sufficiently long time due to the fact that D1 is on. At the end of the switching off process, C1 and C2 are charged to +V/2 with the positive polarity at 1 for C1 and at 3 for C2 and the step-down operation cycle of the chopper begins again (in other words the capacitor bridge C1, C2 returns to its initial state with the mid-point terminal 3 again lying at a voltage halfway between those of the supply terminals 1 and 11).

The regenerative braking circuit comprises C1, C2, L1, L2, L3, L4, D3, D4, D5, D6, T2, T3 and I. In this configuration, the chopper acts as a step-up circuit and the DC machine operates as a generator. Since the direction of the excitation current in the excitation winding J is the same as for traction, residual magnetism enables the machine to start operating as a generator. The electromotive force of the rotating armature I is of the same polarity as during traction, i.e. opposed to the DC supply voltage V. Switching T2 on sets up a current through the armature I and the smoothing inductor L4, round the circuit (7, L2, 9, T2, 11, I, 8, L4, 7). This current is of opposite sign to that of the traction current, while the excitation current in the winding J remains in the same direction as for traction. The current through the armature I increases in absolute value until the thyristor T2 is switched off at an instant t=y·T. The current then circulates via 11, I, 8, L4, 7, L1, 2, D1 and the positive polarity (point 1) of the DC supply voltage V thereby recovering braking energy.

The reversal of the sign of the magnetic moment necessary to pass from traction to braking is thus obtained by reversing the direction of the current through the armature I. The thyristor T2 operates periodically with period T and remains on for durations y·T where the y lies between zero and unity. The current returned to the supply line is equal to zero during the conduction period y·T of T2 and is equal to the current through the armature I during the off time (1−y)T of T2; the average value of this regeneration current is proportional to (1−y). The current in T2 is switched off in the same way as in T1 by switching on T3 but with C1 charged at +3 V/2 and C2 charged at −V/2 at the end of the reversing process (i.e. with the mid-point terminal 3 acquiring a voltage of −V/2 with respect to the negative terminal 11).

The braking resistance RF is put into service by switching on the thyristor T4. Let R be the resistance of RF. When T2 is switched off rheostatic braking will be effected by a resistance R. However, when T2 is switched on, RF is short-circuited and rheostatic braking is effected by a resistance of zero value. Thus, by switching T2 on and off the rheostatic braking resistance can take the value zero or R respectively. Rheostatic braking can be effected both in the presence and in the absence of the DC supply voltage V.

I claim:

1. An electronic control circuit for a separately excited DC machine that includes an armature and a field winding arranged for separate excitation, the electronic control circuit comprising:

positive and negative input terminals for connection to a source of smoothed DC;

first and second armature output terminals for connection to the armature of the DC machine;

a step-up/step-down chopper circuit connected to said input terminals and to said armature output terminals;

a logic control circuit connected to the chopper circuit;

a rheostatic braking circuit connected between the armature output terminals; and a reverser circuit having first and second field winding output terminals for connection to the field winding of the DC machine, input terminals for connection to a source of electrical power and switching means for connecting DC of a selectable polarity to the field winding output terminals;

the improvement wherein the chopper circuit comprises:

a capacitor bridge connected across the positive and negative input terminals, the capacitor bridge comprising a first capacitor and a second capacitor connected in series to provide a capacitor bridge mid-point terminal;

a traction/braking bridge connected across the positive and negative input terminals, the traction/braking bridge comprising a traction arm and a braking arm connected in series to provide a traction/braking bridge mid-point terminal;

each arm of the traction/braking bridge comprising a respective thyristor connected in series with a respective protective inductor and in parallel with a respective diode, the traction and braking thyristors both being connected so as to conduct electricity selective in the direction from the positive input terminal towards the negative input terminal, and the traction and braking diodes being connected with the opposite direction of conductivity; and a turn-off circuit connected in series between the mid-point terminals of said bridges, the turn-off circuit comprising a turn-off inductor connected in series with a bi-directional, static, turn-off switch; one of the armature output terminals being connected to same one of the positive and negative input terminals as is connected to the braking arm of the traction/braking bridge, and the other armature output terminal being connected to the mid-point of the traction/braking bridge, with an armature current smoothing inductor being connected in series in the armature circuit; and the logic control circuit being operatively arranged within the circuit so as to cyclically switch on the thyristor in a selected one of the arms of the traction/braking bridge, and then to switch on the turn-off switch in order to cause said selected thyristor to be turned-off, the on-duty ratio of the traction thyristor determining the tractive effect and the off-duty ratio of the braking thyristor determining the regenerative braking effect.

2. A control circuit according to claim 1, wherein said reverser circuit comprises an AC electric source feeding a primary winding of a transformer having a center-tapped secondary winding with its ends connected to respective pairs of thyristors connected parallel front to back, each thyristor pair being connected to one of said field winding output terminals with the other field winding output terminal being connected to the mid-point of said secondary winding, and said logic control circuit being connected within said electronic control circuit to select one thyristor from each pair to determine whether the DC machine is to operate in the forward or reverse direction.

3. A control circuit according to claim 1, wherein said rheostatic braking circuit comprises a braking thyristor connected in series with a braking resistance, said logic control circuit causing the braking thyristor to conduct with a variable duty ratio during rheostatic braking.

4. A control circuit according to claim 1 or 3, wherein the bi-directional, static, turn-off switch comprises a full-wave rectifier bridge with its AC terminals connected in series in the turn off circuit and its DC terminals connected to be selectively shorted together by a turn-off thyristor.

5. A control circuit according to claim 1 or 3 further including a low pass filter connected ahead of the DC input terminals to smooth an un-smoothed DC supply.

* * * * *